[11] 3,884,557
[45] May 20, 1975

[54] MACROLENS
[75] Inventor: Sumio Nakamura, Tokyo, Japan
[73] Assignee: Olympus Optical Co., Ltd., Tokyo, Japan
[22] Filed: Mar. 1, 1973
[21] Appl. No.: 337,135

[30] Foreign Application Priority Data
  Mar. 2, 1972  Japan.............................. 47-21678

[52] U.S. Cl................................ 350/221; 350/222
[51] Int. Cl........................... G02b 9/36; G02b 9/40
[58] Field of Search............................ 350/222, 221

[56] References Cited
UNITED STATES PATENTS
2,537,912  1/1951  Reiss.................................. 350/221
2,683,395  7/1954  Klemt et al......................... 350/222
2,683,398  7/1954  Klemt et al......................... 350/222

Primary Examiner—John K. Corbin
Assistant Examiner—Conrad Clark
Attorney, Agent, or Firm—Cushman, Darby & Cushman

[57] ABSTRACT

The present invention relates to a macrolens comprising four lenses, the first through fourth lenses, for which various aberrations caused in photographing with higher magnifications are favourably corrected by floating the third lens.

4 Claims, 45 Drawing Figures

SPHERICAL ABERRATION

SINE CONDITION

ASTIGMATISM

DISTORTION

LATERAL CHROMATIC ABERRATION

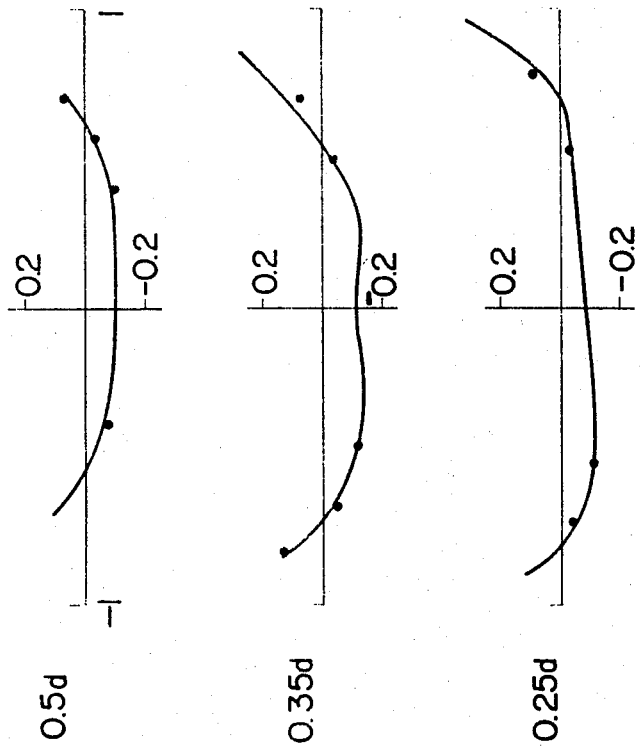
FIG. 2f COMA
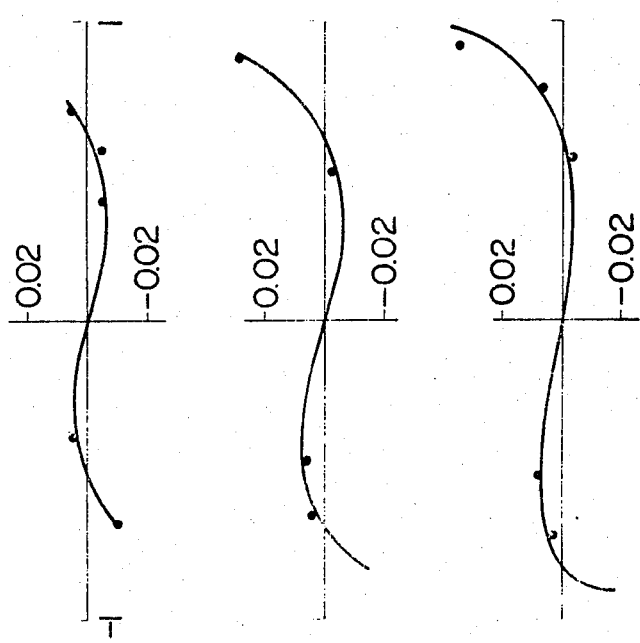
FIG. 2g OFFAXIAL SPHERICAL ABERRATION

PARAXIAL RAY (0.0d)

MARGINAL RAY (0.5d)

ZONAL RAY (0.35d)

——— ΔS
---- ΔM

ZONAL RAY (0.25d)

SPHERICAL ABERRATION
NA.0.021
— d
— c
— F
— g

-0.2  0  0.2 mm

SINE CONDITION

-0.2  0  0.2 mm

ASTIGMATISM
— ΔS
--- ΔM

-0.2  0  0.2 mm

DISTORTION
Bk 21.63

-2  0  2 %

LATERAL CHROMATIC ABERRATION
— c
— F
— g

-0.02  0  0.02 mm

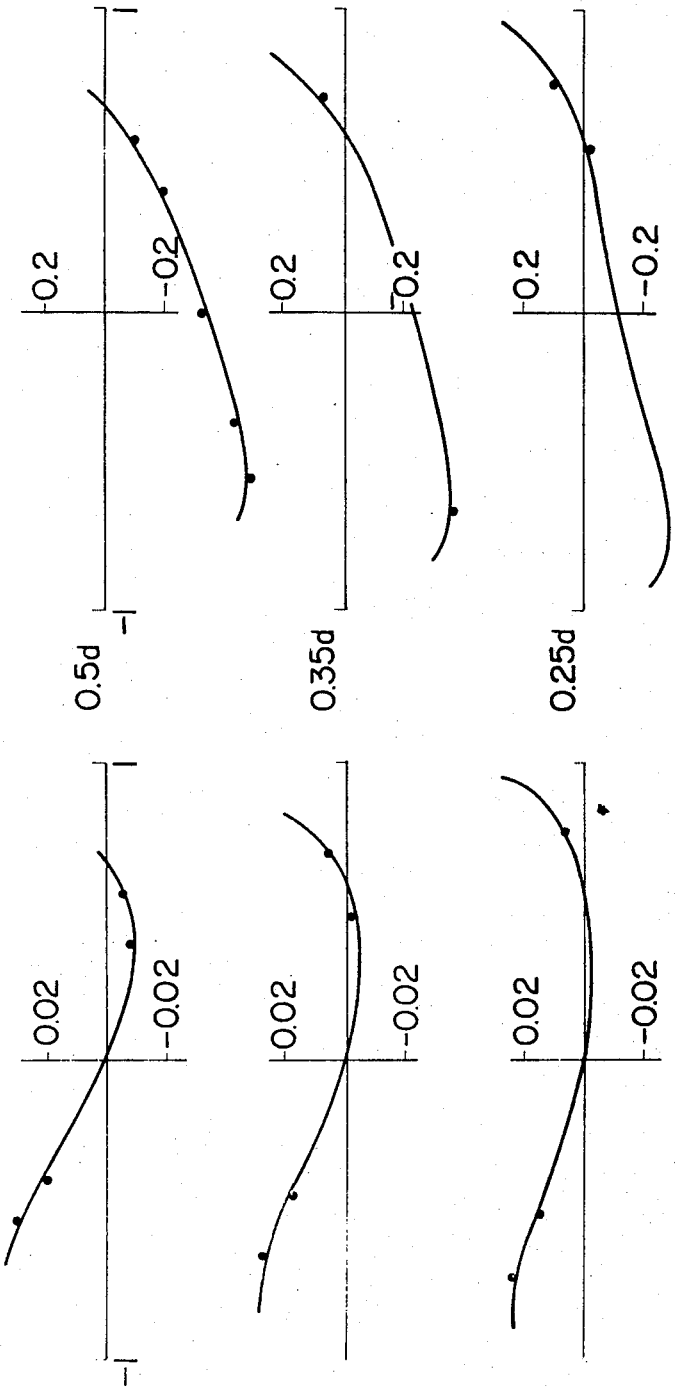

PARAXIAL RAY (0.0d)

MARGINAL RAY (0.5d)

ZONAL RAY (0.35d)

—— ΔS
---- ΔM

ZONAL RAY (0.25d)

SPHERICAL ABERRATION
NA. 0.0236
— d
--- c
—·— F
---- g

-0.2  0  0.2 mm

SINE CONDITION

-0.2  0  0.2 mm

ASTIGMATISM
— ΔS
--- ΔM

-0.2  0  0.2 mm

DISTORTION
Bk' 21.63

-2  0  2

LATERAL CHROMATIC ABERRATION
Bk' 21.63
—·— F
--- g
---- c

-0.02  0  0.02

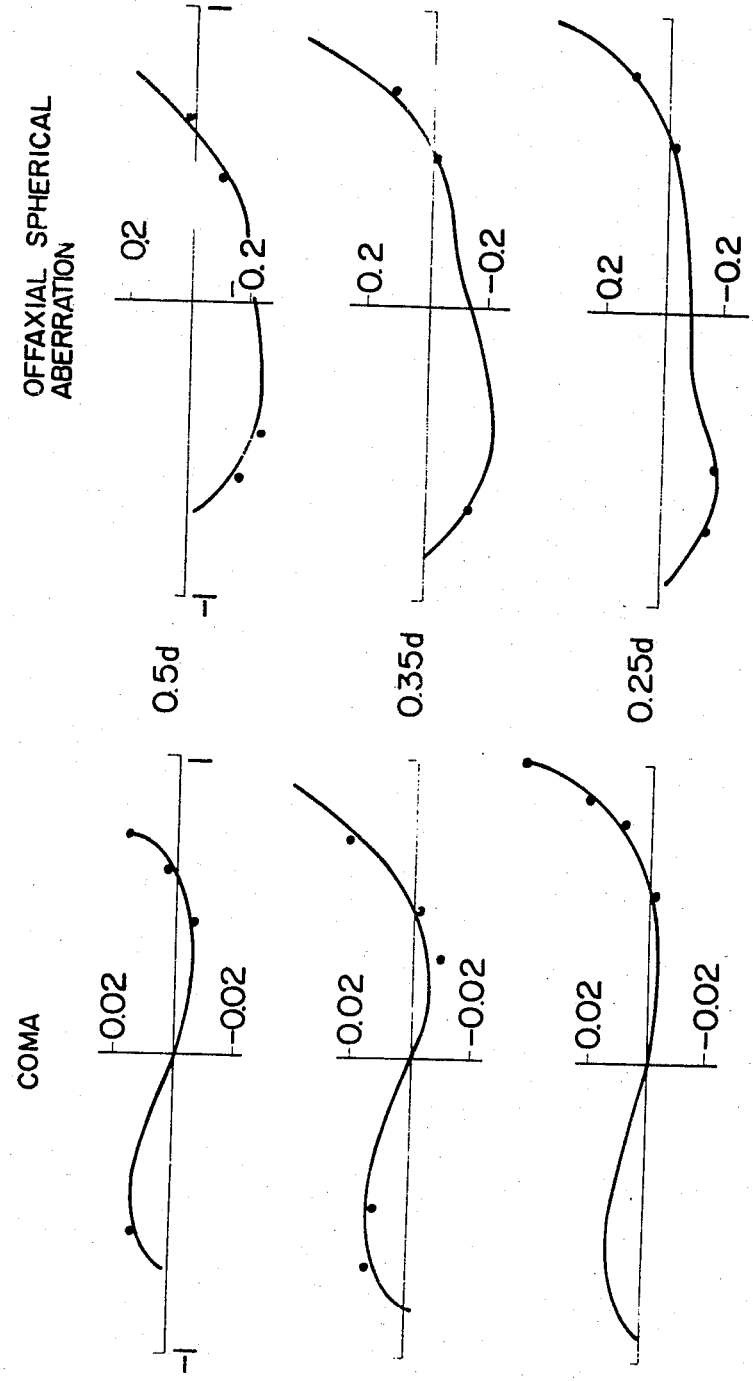

PARAXIAL RAY (0.0d)

MARGINAL RAY (0.5d)

ZONAL RAY (0.35d)

—— ΔS
---- ΔM

ZONAL RAY (0.25d)

SPHERICAL ABERRATION
NA. 0.013
— d
--- c
-·- F
-··- g

-0.2  0  0.2 mm

SINE CONDITION

-0.2  0  0.2 mm

ASTIGMATISM
— ΔS
--- ΔM

-0.2  0  0.2 mm

DISTORTION
Bk' 21.63

-2  0  2 %

LATERAL CHROMATIC ABERRATION
--- c
-·- F
-··- g

-0.02  0  0.02 mm

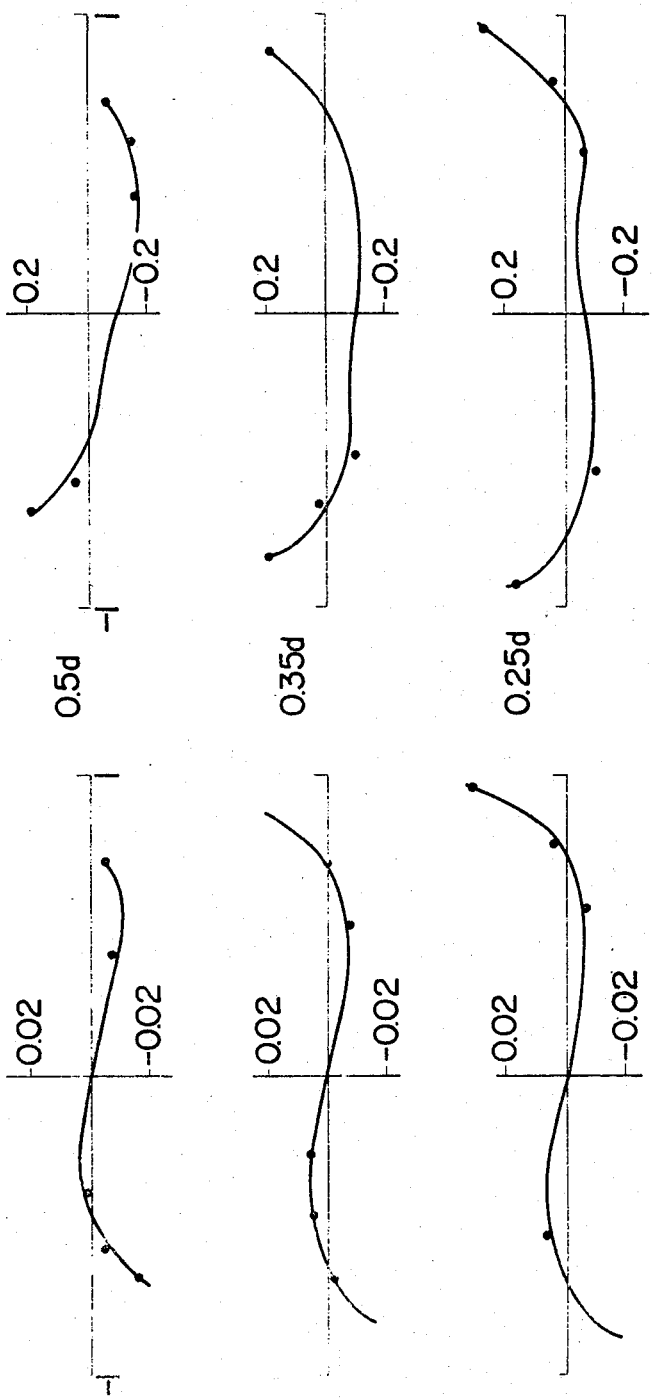
FIG. 8g OFFAXIAL SPHERICAL ABERRATION
FIG. 8f COMA

PARAXIAL RAY (0.0d)

MARGINAL RAY (0.5d)

ZONAL RAY (0.35d)
—— ΔS
---- ΔM

ZONAL RAY (0.25d)

MACROLENS

BACKGROUND OF THE INVENTION

1. Field of the invention

The present invention relates to a photographic lens system and, more particularly to a macrolens.

2. Description of the prior art

For macrolenses, it has been generally required to have high resolving power and aberrations corrected especially favourably over the whole field when photographing with the standard design magnification.

In actual photographing, however, a macrolens is used with magnifications other than its standard design magnification. Therefore, it is necessary to make macrolenses display high performance even when photographing with magnifications other than their standard design magnification.

Typical types of lens systems which have been used as macrolenses are Gauss type, Tesser type and Biometar (Registered Trademark) type. Out of them, Gauss type lens system comprises a larger number of lenses compared with the other two types and it is not necessary to use this type unless a large aperture ratio of F:2.5 or more is required when the standard design magnification is selected as 1 : 1. Tesser type lens system has, side on both sides of the stop, lenses with their concave surfaces positioned on the object. Consequently, the quality of the image is not lowered so much when photographing with a higher magnification and, therefore, the range of magnifications used in actual photographing is wide. But, it is difficult to obtain a stable resolving power over the whole field and the image becomes unfavourable at the marginal portion of the field because of coma and, therefore, the aperture ratio cannot be made so large.

For Biometar type, a larger aperture ratio can be obtained compared with Tesser type and a stable and high resolving power can be obtained over the whole field at the standard design magnification. As however, it is impossible to arrange lenses with their concave surfaces on the object side on both sides of the stop, aberrations become considerably unfavourable compared with Tesser type when photographing with a higher magnification and, consequently, the range of magnifications used in actual photographing is narrow.

For the lens system of the present invention, Biometar type is adopted and decrease of aberrations caused in photographing with higher magnifications is to be restored to the condition of the standard design magnification by means of an automatic correcting mechanism which is briefly described below. That is, when photographing with a higher magnification by a Biometar type lens system, quality of the image at the central portion of the field does not decrease so much, but quality of the image at the marginal portion of the field decreases conspicuously. This is because the astigmatism and asymmetric aberration become unfavourable. To recover from such deterioration of aberrations, an automatic correcting mechanism to float a pre-determined lens is adopted.

SUMMARY OF THE INVENTION

It is a primary object of the present invention to provide macrolens having a wide range of photographing magnifications for which stable high resolving power can be obtained even when photographed with magnifications other than the standard design magnification and for which aberrations are favourably corrected even when photographing with higher magnifications, by adopting a floating mechanism for a pre-determined lens.

The macrolens according to the present invention comprises the following four lenses. That is, the first lens is a positive meniscus lens with its convex surface positioned on the object side, the second lens is a cemented negative meniscus lens, the third lens is a negative meniscus lens with its concave surface positioned on the object side and the fourth lens is a positive lens. Besides, the macrolens of the present invention satisfies the conditions as listed below, when reference symbols $f_2$ and $f_3$ respectively represent focal lengths of the front and rear lenses of the cemented second lens, reference symbols $v_2$ and $v_3$ respectively represent Abbe's numbers of said lenses, reference symbol $V_4$ represents Abbe's number of the third lens, reference symbol $r_6$ represents the radius of curvature of the front surface of the third lens, reference symbol $f_{123}$ represents the total focal length of the first and second lenses and reference symbol $f$ represents the total focal length of the lens system as a whole.

(1) $\quad |\delta K_2| \leq 0.065 \times \dfrac{1}{f}$
$\quad\quad\quad (\delta K_2 = 1/f_2 v_2 + 1/f_3 v_3)$
(2) $\quad 33 \leq v_4$
(3) $\quad -0.14f \leq r_6 \leq -0.3f$
(4) $\quad f_{123} \leq 2f$ As is known widely, the condition for obtaining achromatism for a cemented lens component comprising $n$ pieces of thin lenses is given by $$1/f_i \, v_i = 0$$

Reference symbol $\delta K_2$ is used by applying the above-mentioned condition to the second lens component of the lens system according to the present invention, as stated in the condition (1) above.

Besides the above-mentioned arrangement, the macrolens of the present invention is provided with a means to float a pre-determined lens, i.e., the third lens, by mcehanically connecting the third lens to the advancing mechanism of the lens system as a whole at the time of photographing with a higher magnification, in order to favourably correct aberrations, which occur when photographing with a higher magnification and which are disadvantages of Biometar type lens systems.

As the third lens of the lens system according to the present invention is floated as described above, it is necessary to correct aberrations on the front and rear sides of the stop separately. For this purpose, the lens system of the present invention is arranged to make the sum of dispersion on the front side of the stop as small as possible in its absolute value and to make said sum a negative value. Besides, the axial and offaxial chromatic aberrations are favourably corrected in the range from the c-line to the g-line in order to achieve a stable and favourably corrected chromatic aberration even when the photographing magnification is varied. The condition (1) is established for this purpose. Any deviation from the range of the condition (1) makes it impossible to obtain a negative sum of a small absolute value for the dispersion of lenses on the front side of the stop and, consequently, it becomes impossible to favourably correct the offaxial chromatic aberration. Besides, in this case, it is desirable to make the difference of refractive indexes of the cemented two lenses same as or smaller than 0.01 and to make the difference of Abbe's numbers of the convex and concave lenses same as or larger than 15.

For correction of the astigmatism and asymmetry of coma, the third lens, a negative meniscus lens, plays as important role. Besides, to obtain a stable and high resolving power over the whole field, the third lens is required to be a concave lens having concentric spherical surfaces for which the radius of curvature $r_6$ of its surface on the object side is slightly smaller than the radius of curvature $r_7$ of its surface on the image side and is also required to be made of such material providing a high refractive index and high dispersion. Conditions (2) and (3) are established to fulfill the above requirement. If the condition (2) is not satisfied, it becomes impossible to balance the dispersions on the front and rear sides of the stop even when the fourth lens is made of such material which provides a dispersive power as low as possible. The condition (3) is closely related with the floating mechanism. If the value of $r_6$ exceeds the upper limit of the condition (3), the spherical aberration is corrected excessively and the astigmatism also becomes unfavourable. If the value $r_6$ is smaller than the lower limit, it becomes difficult to correct the asymmetry of coma.

The condition (4) is established to achieve effective correcting results by floating of the lens. That is, by arranging the lens group on the front side of the stop as an afocal lens or a lens group having an extremely small positive power, marginal rays from the first and second lenses are made close to parallel rays between the second and third lenses. Thus, deterioration of the image at the central portion of the field caused by floating the third lens is minimized. If the total focal length $f_{123}$ of the first and second lenses becomes smaller than $2f$ in the condition (4), the power of the fourth lens has to be made extremely large because the third lens has a negative power, and, consequently, it becomes difficult to correct aberrations favourably. Besides, the quality of the image at the central portion of the field is subjected to a considerably unfavourable influence caused by floating of the third lens, thus the quality of the image deteriorates remarkably at the center of the field angle even if floating has a favourable effect on the marginal portion of the field.

In the following, preferred embodiments of the present invention are described according to the accompanying drawings.

DESCRIPTION OF THE PREFERRED EMBODIMENTS

Figure 1:
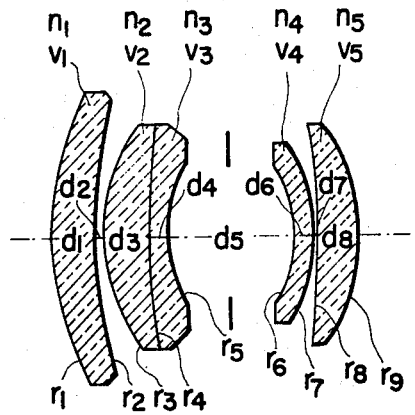
FIG. 1 shows a sectional view illustrating the composition of the macrolens according to the present invention.
Figure 2A:
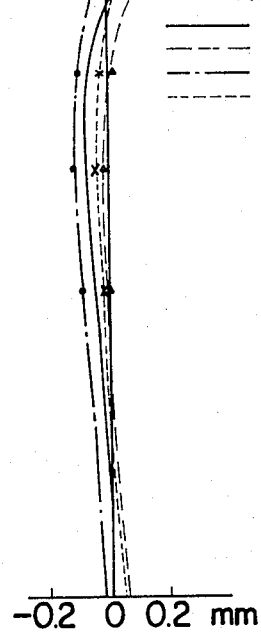
FIG. 2 illustrates curves showing aberrations at the standard design magnification of the embodiment 1 of the present invention.
Figure 2B:
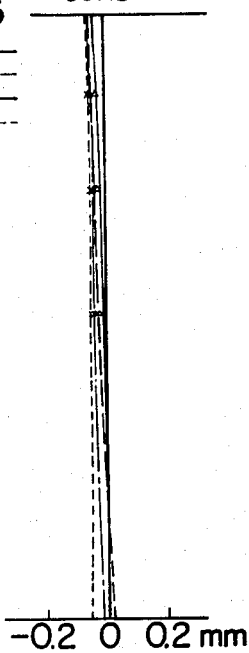
Figure 2C:
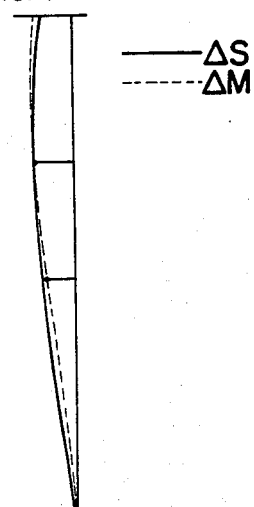
Figure 2D:
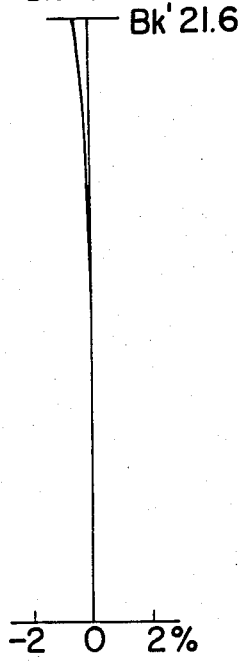
Figure 2E:
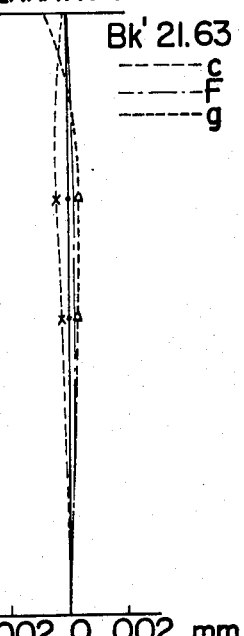

Embodiments of the macrolens according to the present invention illustrated in FIG. 1 are as shown below.

EMBODIMENT 1

The standard design magnification of the embodiment 1 is 0.1.

| | | | |
|---|---|---|---|
| $r_1$=24.549 | $d_1$=4.13 | | |
| | | $n_1$=1.72000 | $v_1$=43.70 |
| $r_2$=47.203 | $d_2$=0.25 | | |
| $r_3$=14.356 | $d_3$=4.26 | | |
| | | $n_2$=1.67003 | $v_2$=47.25 |
| $r_4$=70.080 | $d_4$=1.30 | | |
| | | $n_3$=1.67270 | $v_3$=32.10 |
| $r_5$= 9.613 | $d_5$=10.90 | | |
| $r_6$=−10.177 | $d_6$=1.54 | | |
| | | $n_4$=1.76182 | $v_4$=26.55 |
| $r_7$=−13.869 | $d_7$=0.20 | | |
| $r_8$=−54.008 | $d_8$=3.66 | | |
| | | $n_5$=1.67000 | $v_5$=57.33 |
| $r_9$=−15.167 | | | |
| $f$=51.78 | | | |
| $f_2$=26.144 | | | |
| $f_3$=−16.706 | | | |
| $f_{123}$=138.96 | | | | where reference symbols $r_1$ through $r_9$ represent radii of curvature of successive lenses, reference symbols $d_1$ through $d_8$ represent thickness of successive lenses and distances between lenses on the axis, reference symbols $n_1$ through $n_5$ represent refractive indexes of successive lenses, $v_1$ through $v_5$ represent Abbe's number of successive lenses, reference symbol $f$ represents the total focal length of the whole lens system, reference symbols $f_2$ and $f_3$ respectively represent focal lengths of the front and rear lenses of the cemented second lens and reference symbol $f_{123}$ represents the total focal length of the first and second lenses.

Figure 3A:
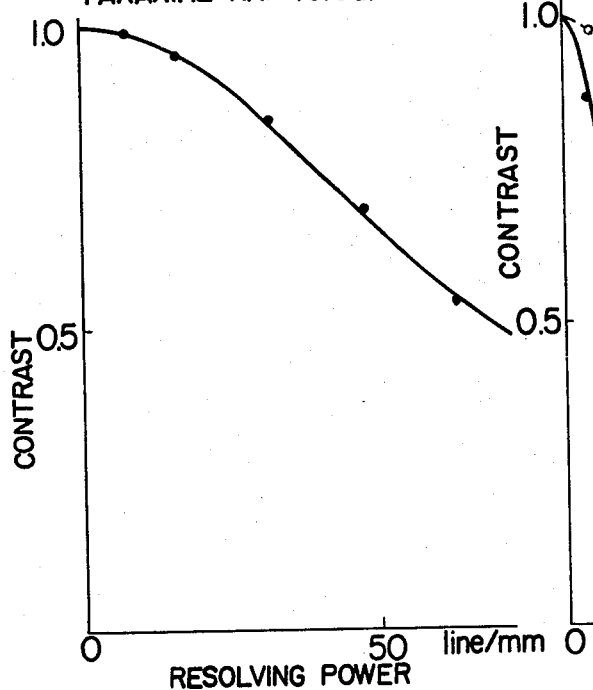
FIG. 3 shows a graph illustrating the resolving power of the embodiment 1.
Figure 3B:
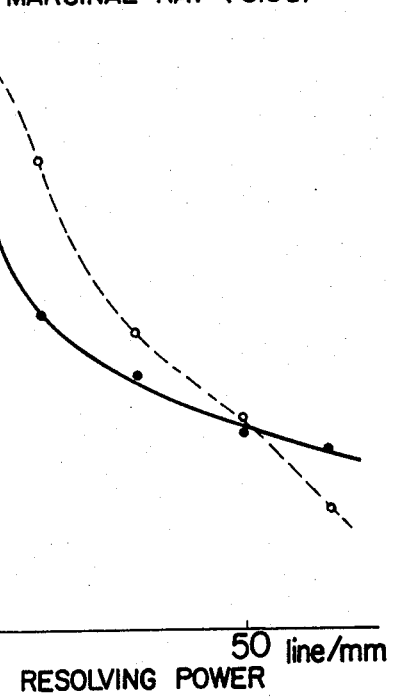
Figure 3C:
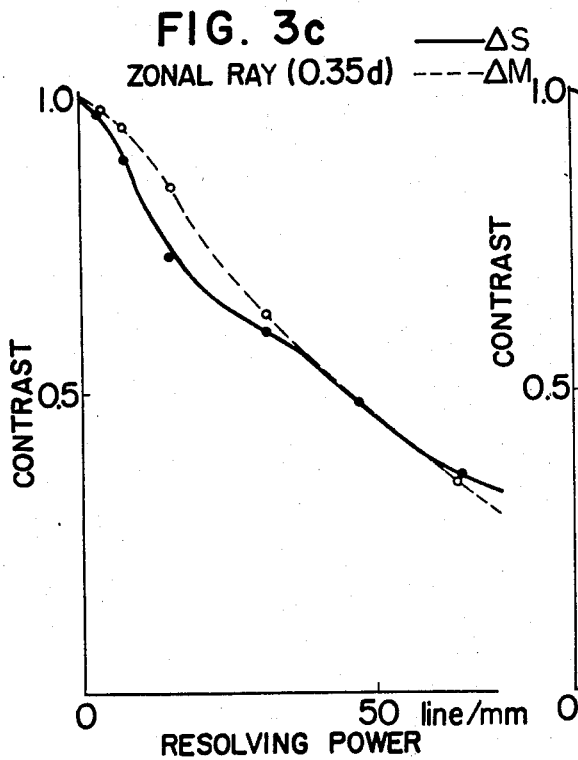
Figure 3D:
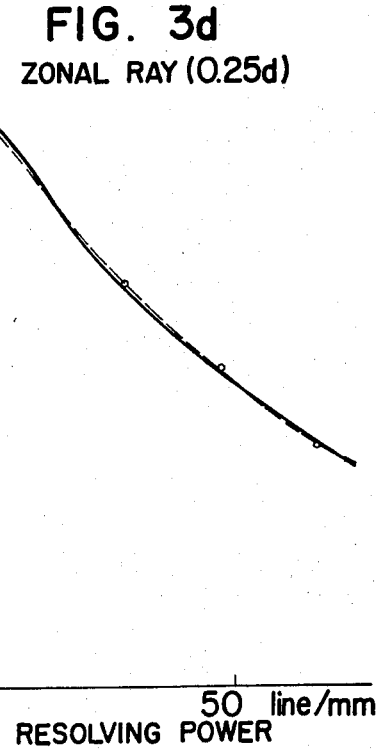

FIG. 2a through FIG. 2g respectively show the spherical aberration, sine condition, astigmatism, distortion, lateral chromatic aberration, coma and offaxial spherical aberration of the embodiment 1 of the present invention. FIG. 3a through FIG. 3d show the relation between the contrast and resolving power of said embodiment 1. FIG. 3a shows the resolving power for paraxial rays (0.0d, reference symbol d represents the lens diameter). FIG. 3b shows the resolving power for marginal rays (0.5d) and FIG. 3c and FIG. 3d respectively show resolving powers for zonal rays (0.35d, 0.25d).

Figure 4A:
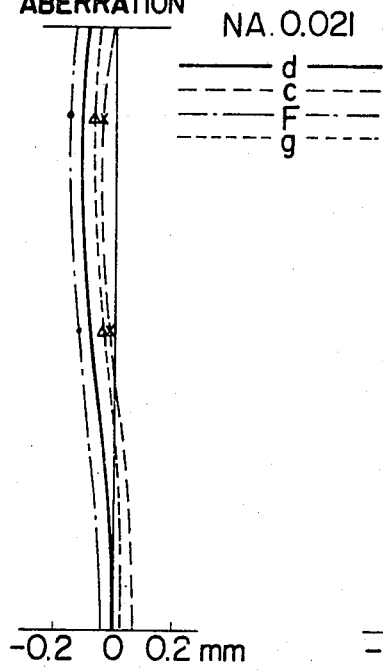
FIG. 4 illustrates the curves of aberrations of the embodiment 1 when the magnification is 0.2.
Figure 4B:
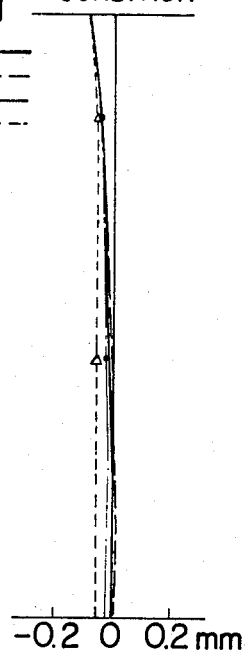
Figure 4C:
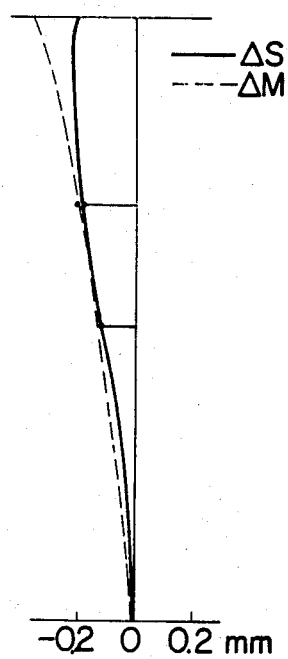
Figure 4D:
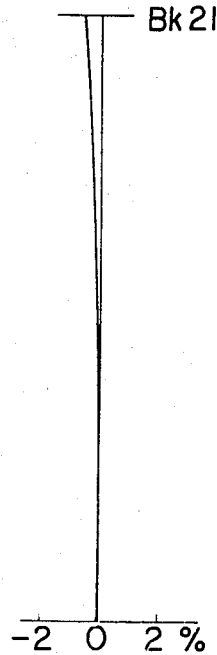
Figure 4E:
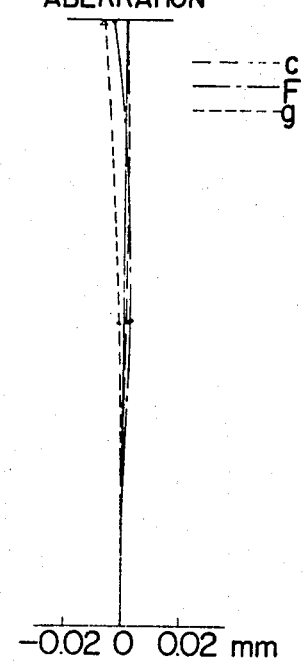
Figure 5A:
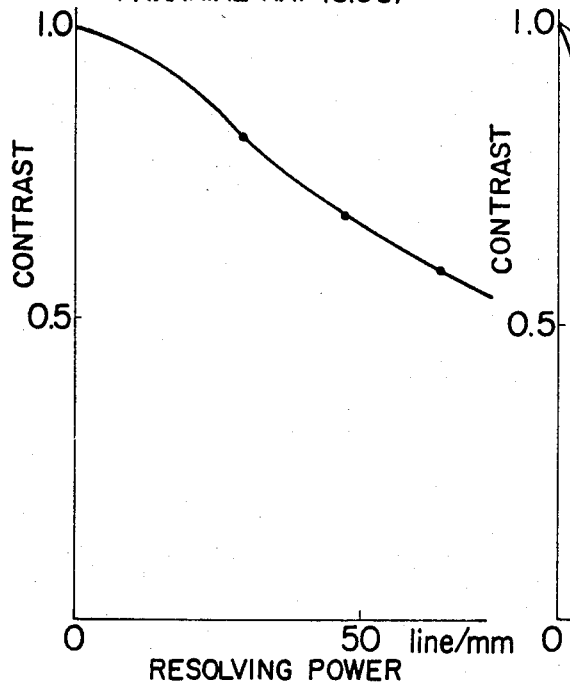
FIG. 5 shoes a graph illustrating the resolving power of the embodiment 1 when the magnification is 0.2.
Figure 5B:
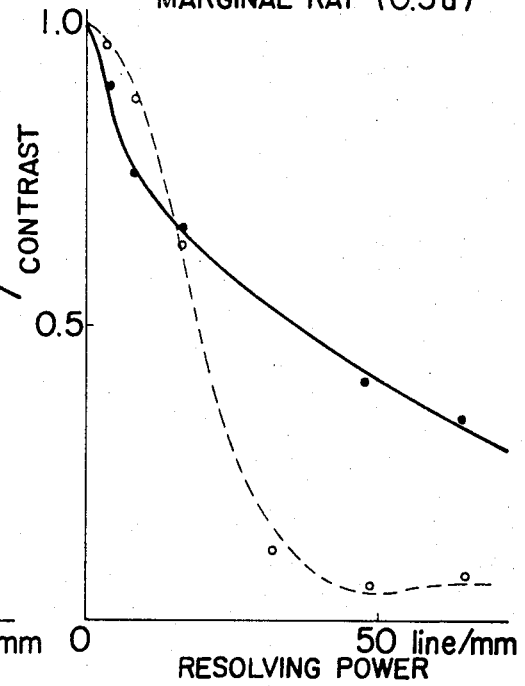
Figure 5C:
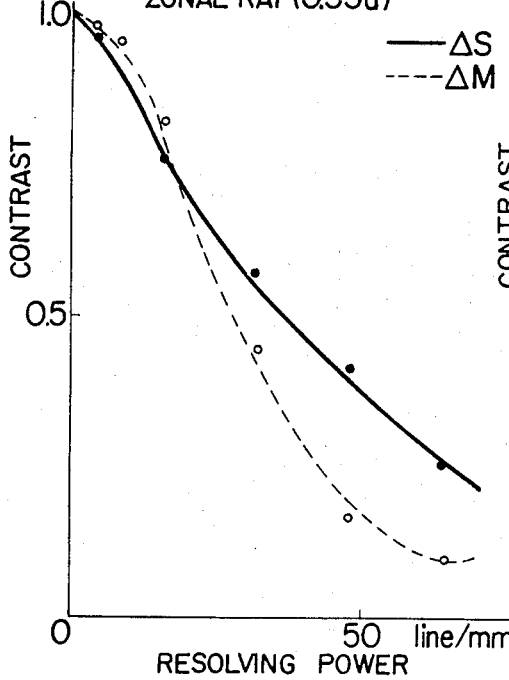
Figure 5D:
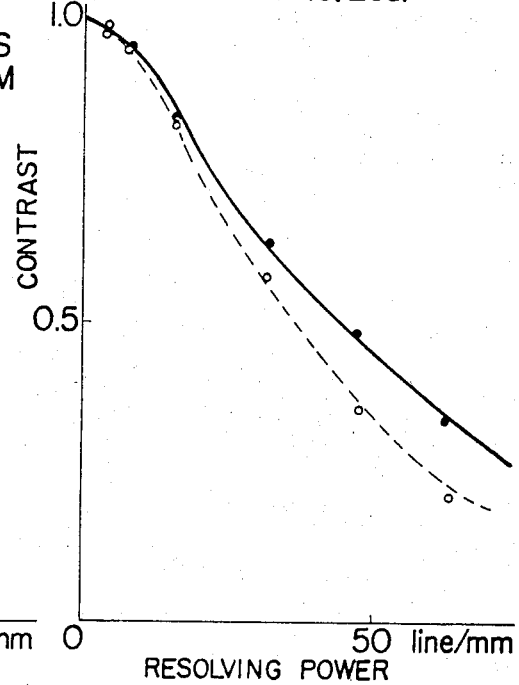
Figure 6A:
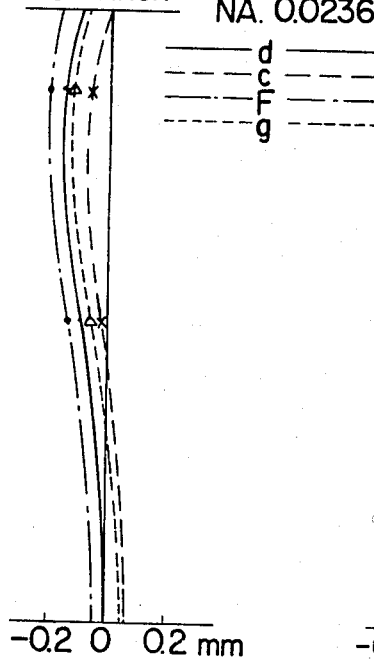
FIG. 6 shows a graph of aberrations of the embodiment 1 when its third lens is floated and the magnification is 0.2.
Figure 6B:
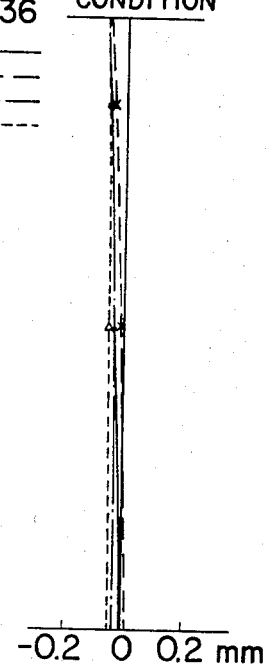
Figure 6C:
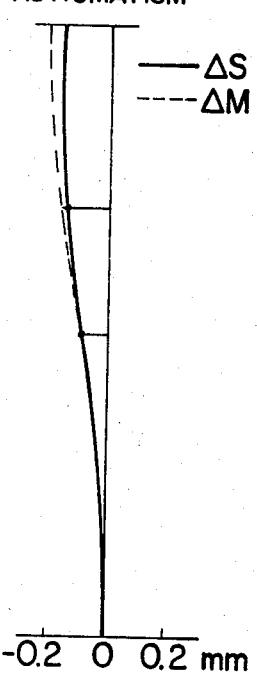
Figure 6D:
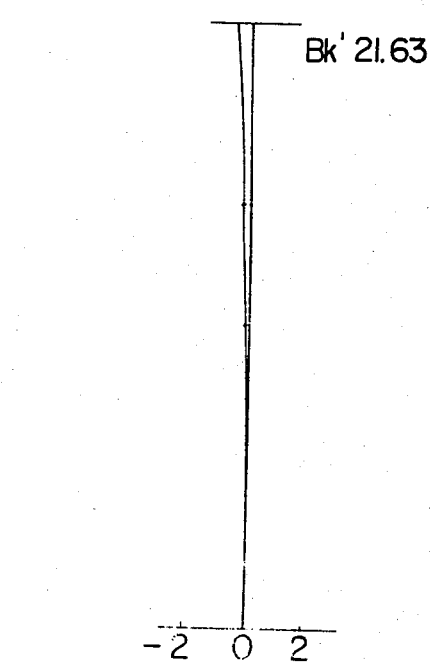
Figure 6E:
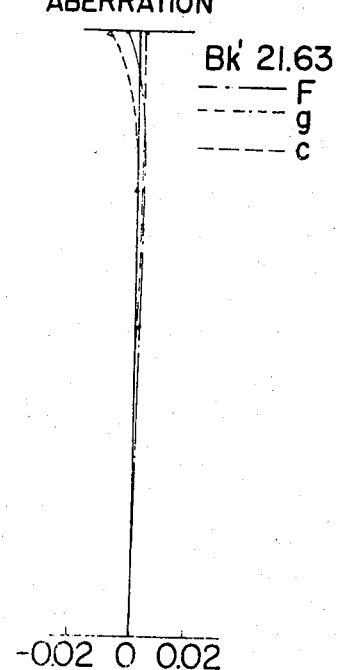
Figure 7A:
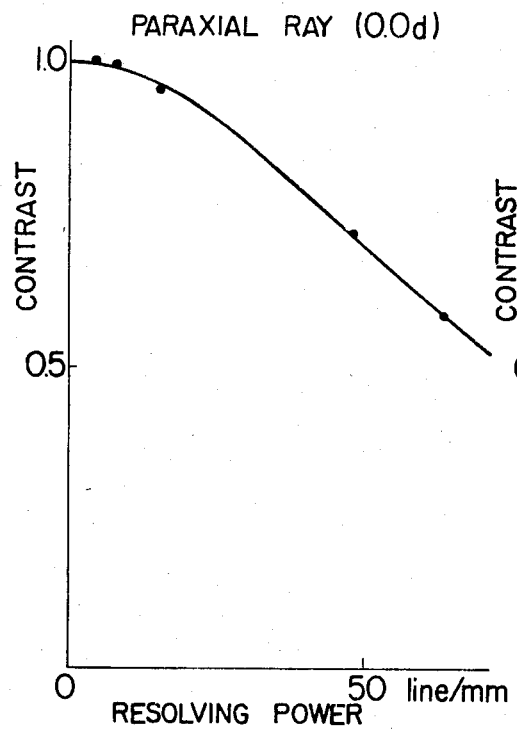
FIG. 7 shows a graph illustrating the resolving power of the embodiment 1 under conditions same as those for FIG. 6.
Figure 7B:
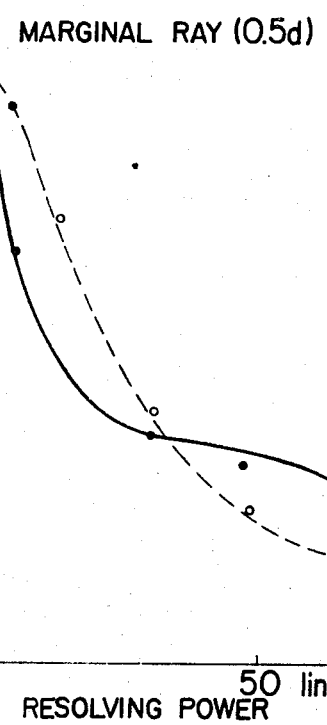
Figure 7C:
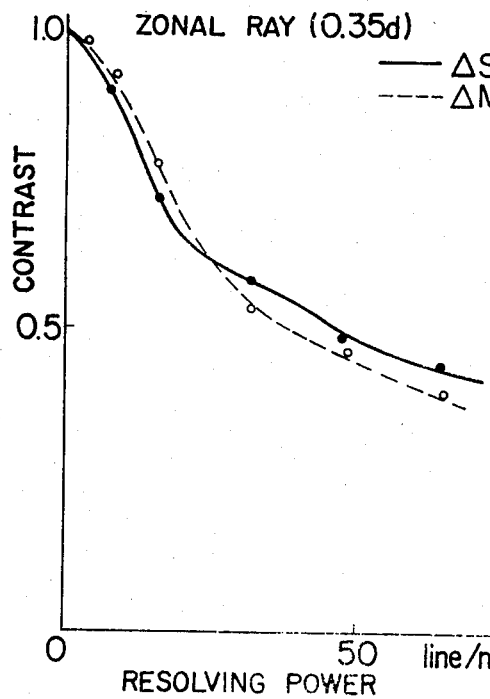
Figure 7D:
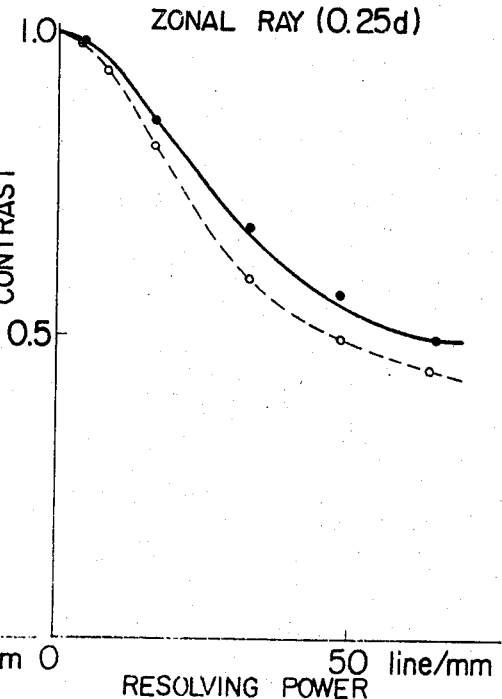
Figure 8A:
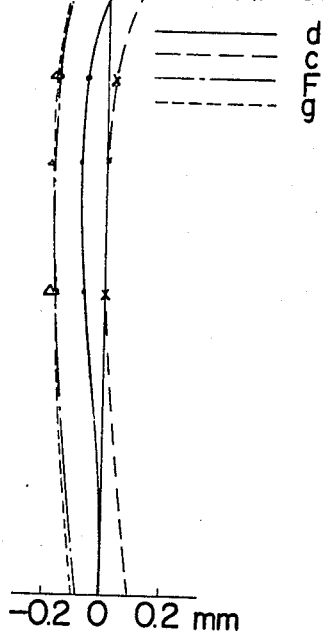
FIG. 8 shows a graph illustrating aberrations of the embodiment 2 of the present invention at its standard design magnification 0.1.
Figure 8B:
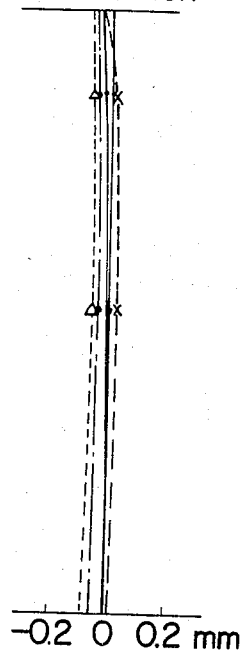
Figure 8C:
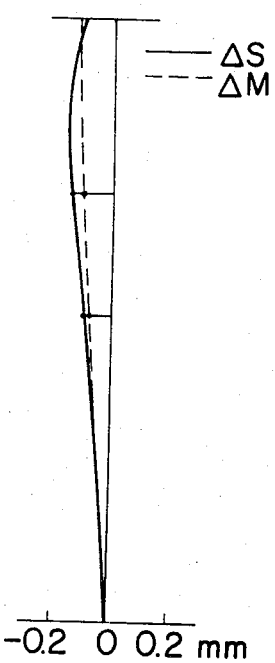
Figure 8D:
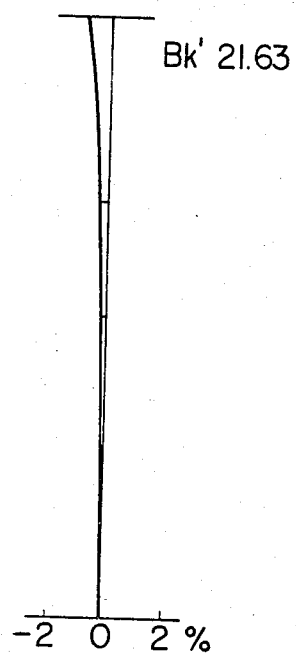
Figure 8E:
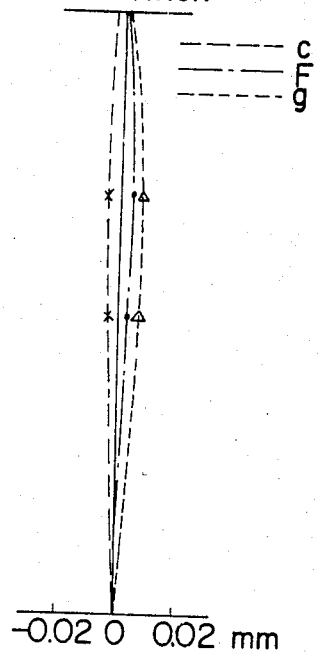
Figure 9A:
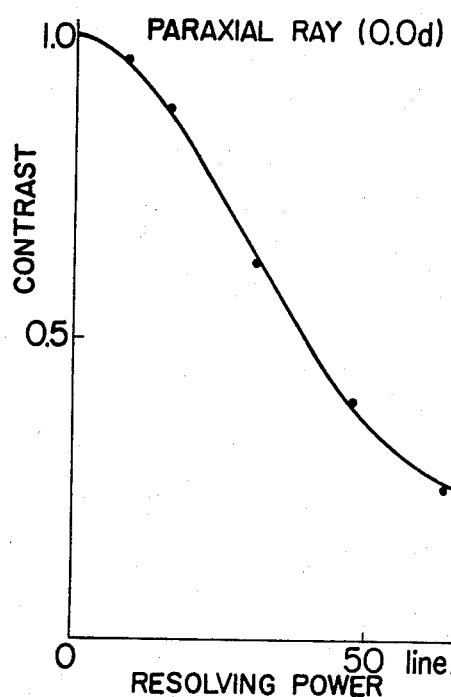
FIG. 9 shows a graph illustrating the resolving power of the embodiment 2 under conditions same as those for FIG. 8.
Figure 9B:
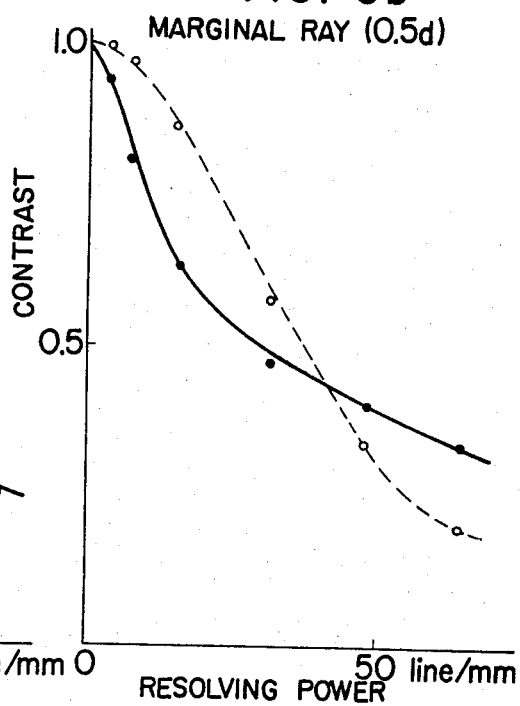
Figure 9C:
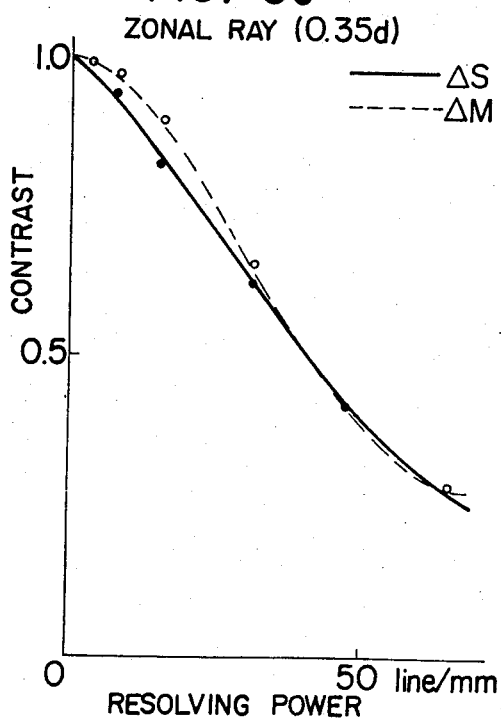
Figure 9D:
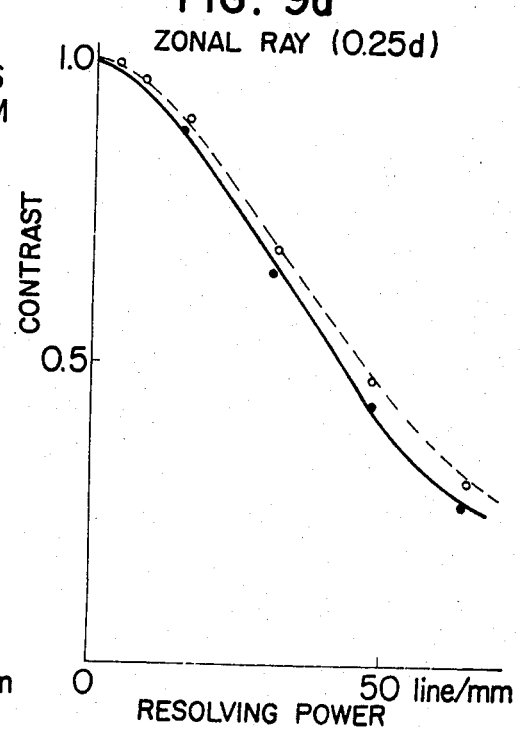

FIG. 4a through FIG. 4g respectively show the spherical aberration, sine condition, astigmatism, distortion, lateral chromatic aberration, coma and offaxial spherical aberration of the embodiment 1 when the magnification is 0.2 without floating the third lens. FIG. 5a through FIG. 4d respectively show relations between the contrast and resolving power in said case for rays at positions of 0.0d, 0.5d, 0.35d and 0.25d.

Besides, when the magnification is 0.2 by floating the third lens of the present embodiment, it becomes $d_5=10.775$, $d_7=0.325$ and $f=51.688$. FIG. 4a through FIG. 4g respectively show the spherical aberration, sine condition, astigmatism, distortion, lateral chromatic aberration, coma and offaxial spherical aberration in said case. FIG. 7a through FIG. 7d respectively show relations between the contrast and resolving power in said case for rays at $0.0d$, $0.5d$, $0.35d$ and $0.25d$.

Embodiment 2

The standard design magnification of another embodiment, the embodiment 2, is 0.1 like that of the above-mentioned embodiment 1.

| | | | |
|---|---|---|---|
| $r_1=24.8530$ | $d_1=4.096$ | | |
| | | $n_1=1.72000$ | $v_1=42.08$ |
| $r_2=46.114$ | $d_2=0.2$ | | |
| $r_3=14.141$ | $d_3=4.188$ | | |
| | | $n_2=1.66892$ | $v_2=44.98$ |
| $r_4=70.297$ | $d_4=1.288$ | | |
| | | $n_3=1.67270$ | $v_3=32.10$ |
| $r_5=9.561$ | $d_5=10.994$ | | |
| $r_6=-10.11$ | $d_6=1.612$ | | |
| | | $n_4=1.80518$ | $v_4=25.43$ |
| $r_7=-13.601$ | $d_7=0.2$ | | |
| $r_8=-55.798$ | $d_8=3.613$ | | |
| | | $n_5=1.67000$ | $v_5=57.33$ |
| $r_9=-15.212$ | | | |
| $f=51.781$ | | | |
| $f_2=25.695$ | | | |
| $f_3=-16.592$ | | | |
| $f_{123}=152.884$ | | | | where reference symbols $r_1$ through $r_9$ represent radii of curvature of successive lenses, reference symbols $d_1$ through $d_8$ represent thickness of successive lenses and distances between lenses on the axis, reference symbols $n_1$ through $n_5$ represent refractive indexes of successive lenses, $v_1$ through $v_5$ represent Abbe's number of successive lenses, reference symbol $f$ represents the total focal length of the whole lens system, reference symbols $f_2$ and $f_3$ respectively represent focal lengths. of lengths front and rear lenses of the cemented second lens and reference symbol $f_{123}$ represents the total focal length of the first and second lenses.

FIG. 8a through FIG. 8g respectively show the spherical aberration, sine condition, astigmatism, distortion, lateral chromatic aberration, coma and offaxial spherical aberration of the embodiment 2, FIG. 9a through FIG. 9d respectively show relations between the contrast and resolving power of the embodiment 2 for paraxial rays ($0.0d$), marginal rays ($0.5d$) and zonal rays ($0.35d$ and $0.25d$).

From the above-mentioned graphs of aberration curves of the embodiments 1 and 2, it is evident that various aberrations at the standard design magnification are quite favourably corrected, distortion is extremely small and the resolving power is very high even at the marginal portion of the field.

When a comparison is made between cases where the pre-determined lens (third lens) is floated and not floated when photographing with higher magnifications, the astigmatism is quite favourably corrected when the third lens is floated. Besides, as for the resolving power, the effect of floating is more remarkable at portions nearer the margin of the field.

I claim:

1. A macrolens comprising four lens components, the first through fourth lens components, wherein said first lens component is a positive meniscus lens of which convex surface having a small radius curvature is directed to the object side, said second lens component is a negative meniscus doublet lens which is cemented with a positive meniscus lens and a negative meniscus lens directed their convex surface to the object side, said third lens component is a negative meniscus lens of which concave surface having a small radius curvature is directed to the object side, said fourth lens component is a positive meniscus lens of which concave surface having a large radius curvature is directed to the object side, said macrolens having the following numerical data

| | | | |
|---|---|---|---|
| $r_1=24.549$ | $d_1=4.13$ | | |
| | | $n_1=1.72000$ | $v_1=43.70$ |
| $r_2=47.203$ | $d_2=0.25$ | | |
| $r_3=14.356$ | $d_3=4.26$ | | |
| | | $n_2=1.67003$ | $v_2=47.25$ |
| $r_4=70.080$ | $d_4=1.30$ | | |
| | | $n_3=1.67270$ | $v_3=32.10$ |
| $r_5=9.613$ | $d_5=10.90$ | | |
| $r_6=-10.177$ | $d_6=1.54$ | | |
| | | $n_4=1.76182$ | $v_4=26.55$ |
| $r_7=-13.869$ | $d_7=0.20$ | | |
| $r_8=-54.008$ | $d_8=3.66$ | | |
| | | $n_5=1.67000$ | $v_5=57.33$ |
| $r_9=-15.167$ | | | |
| $f=51.78$ | | | |
| $f_2=26.144$ | | | |
| $f_3=-16.706$ | | | |
| $f_{123}=138.96$ | | | | where reference symbols $r_1$ through $r_9$ represent radii of curvature of successive lenses, reference symbols $d_1$ through $d_8$ represent thickness of successive lenses and distances between lenses on the axis, reference symbols $n_1$ through $n_5$ represent refractive indexes of successive lenses, reference symbols $v_1$ through $v_5$ represent Abbe's number of successive lenses, reference symbol $f$ represents the total focal length of the whole lens system, reference symbols $f_2$ and $f_3$ respectively represent focal lengths of the front and rear lenses of the cemented second lens component and reference symbol $f_{123}$ represents the total focal length of the first and second lens components.

2. A macrolens comprising four lens components, the first through fourth lens components, wherein said first lens component is a positive meniscus lens of which convex surface having a small radius curvature is directed to the object side, said second lens component is a negative meniscus doublet lens which is cemented with a positive meniscus lens and a negative meniscus lens directed their convex surface to the object side, said third lens component is a negative meniscus lens of which concave surface having a small radius curvature is directed to the object side, said fourth lens component is a positive meniscus lens of which concave surface having a large radius curvature is directed to the object side, said macrolens having the following numerical data

| | | | |
|---|---|---|---|
| $r_1=24.8530$ | $d_1=4.096$ | | |
| | | $n_1=1.72000$ | $v_1=42.08$ |
| $r_2=46.114$ | $d_2=0.2$ | | |
| $r_3=14.141$ | $d_3=4.188$ | | |
| | | $n_2=1.66892$ | $v_2=44.98$ |
| $r_4=70.297$ | $d_4=1.288$ | | |
| | | $n_3=1.67270$ | $v_3=32.10$ |
| $r_5=9.561$ | $d_5=10.994$ | | |
| $r_6=-10.111$ | $d_6=1.612$ | | |
| | | $n_4=1.80518$ | $v_4=25.43$ |
| $r_7=-13.601$ | $d_7=0.2$ | | |
| $r_8=-55.798$ | $d_8=3.613$ | | |

-Continued $r_9 = -15.212$
$f = 51.781$
$f_2 = 25.695$
$f_3 = -16.592$
$f_{123} = 152.884$ $n_5 = 1.67000$    $v_5 = 57.33$ where reference symbols $r_1$ through $r_9$ represent radii of curvature of successive lenses, reference symbols $d_1$ through $d_8$ represent thickness of successive lenses and distances between lenses on the axis, reference symbols $n_1$ through $n_5$ represent refractive indexes of successive lenses, reference symbols $v_1$ through $v_5$ represent Abbe's number of successive lenses, reference symbol $f$ represents the total focal length of the whole lens system, reference symbols $f_2$ and $f_3$ respectively represent focal lengths of the front and rear lenses of the cemented second lens compound and reference symbol $f_{123}$ represents the total focal length of the first and second lens components.

3. A macrolens comprising four lens components, the first through fourth lens components, wherein said first lens component is a positive meniscus lens of which convex surface having a small radius curvature is directed to the object side, said second lens component is a negative meniscus doublet lens which is cemented with a positive meniscus lens and a negative meniscus lens directed their convex surface to the object side, said third lens component is a negative meniscus lens of which concave surface having a small radius curvature is directed to the object side, said fourth lens component is a positive meniscus lens of which concave surface having a large radius curvature is directed to the object side, said macrolens having the following numerical data and being arranged to move said third lens component along the optical axis in relation to the movement of said lens system as a whole so as to correct aberration incurred at the close-up photography:

| | | | |
|---|---|---|---|
| $r_1 = 24.549$ | $d_1 = 4.13$ | | |
| | | $n_1 = 1.72000$ | $v_1 = 43.70$ |
| $r_2 = 47.203$ | $d_2 = 0.25$ | | |
| $r_3 = 14.356$ | $d_3 = 4.26$ | | |
| | | $n_2 = 1.67003$ | $v_2 = 47.25$ |
| $r_4 = 70.080$ | $d_4 = 1.30$ | | |
| | | $n_3 = 1.67270$ | $v_3 = 32.10$ |
| $r_5 = 9.613$ | $d_5 = 10.90$ | | |
| $r_6 = -10.177$ | $d_6 = 1.54$ | | |
| | | $n_4 = 1.76182$ | $v_4 = 26.55$ |
| $r_7 = -13.869$ | $d_7 = 0.20$ | | |
| $r_8 = 54.008$ | $d_8 = 3.66$ | | |
| | | $n_5 = 1.67000$ | $v_5 = 57.33$ |
| $r_9 = -15.167$ | | | |

$f = 51.78$
$f_2 = 26.144$
$f_3 = -16.706$
$f_{123} = 138.96$ where reference symbols $r_1$ through $r_9$ represent radii of curvature of successive lenses, reference symbols $d_1$ through $d_8$ represent thickness of successive lenses and distances between lenses on the axis, reference symbols $n_1$ through $n_5$ represent refractive indexes of successive lenses, reference symbols $v_1$ through $v_5$ represent Abbe's number of successive lenses, reference symbol $f$ represents the total focal length of the whole lens system, reference symbols $f_2$ and $f_3$ respectively represent focal lengths of the front and rear lenses of the cemented second lens component and reference symbol $f_{123}$ represents the total focal length of the first and second lens components.

4. A macrolens comprising four lens components, the first through fourth lens components, wherein said first lens component is a positive meniscus lens of which convex surface having a small radius curvature is directed to the object side, said second lens component is a negative meniscus doublet lens which is cemented with a positive meniscus lens and a negative meniscus lens directed their convex surface to the object side, said third lens component is a negative meniscus lens of which concave surface having a small radius curvature is directed to the object side, said fourth lens component is a positive meniscus lens of which concave surface having a large radius curvature is directed to the object side, said macrolens having the following numerical data and being arranged to move said third lens component along the optical axis in relation to the movement of said lens system as a whole so as to correct aberration incurred at the close-up photography:

| | | | |
|---|---|---|---|
| $r_1 = 24.8530$ | $d_1 = 4.096$ | | |
| | | $n_1 = 1.72000$ | $v_1 = 42.08$ |
| $r_2 = 46.114$ | $d_2 = 0.2$ | | |
| $r_3 = 14.141$ | $d_3 = 4.188$ | | |
| | | $n_2 = 1.66892$ | $v_2 = 44.98$ |
| $r_4 = 70.297$ | $d_4 = 1.288$ | | |
| | | $n_3 = 1.67270$ | $v_3 = 32.10$ |
| $r_5 = 9.561$ | $d_5 = 10.994$ | | |
| $r_6 = -10.111$ | $d_6 = 1.612$ | | |
| | | $n_4 = 1.80518$ | $v_4 = 25.43$ |
| $r_7 = -13.601$ | $d_7 = 0.2$ | | |
| $r_8 = -55.798$ | $d_8 = 3.613$ | | |
| | | $n_5 = 1.67000$ | $v_5 = 57.33$ |
| $r_9 = -15.212$ | | | |

$f = 51.781$
$f_2 = 25.695$
$f_3 = -16.592$
$f_{123} = 152.884$ where reference symbols $r_1$ through $r_9$ represent radii of curvature of successive lenses, reference symbols $d_1$ through $d_8$ represent thickness of successive lenses and distances between lenses on the axis, reference symbols $n_1$ through $n_5$ represent refractive indexes of successive lenses, reference symbols $v_1$ through $v_5$ represent Abbe's number of successive lenses, reference symbol $f$ represents the total focal length of the whole lens system, reference symbols $f_2$ and $f_3$ respectively represent focal lengths of the front and rear lenses of the cemented second lens component and reference symbol $f_{123}$ represents the total focal length of the first and second lens components.

* * * * *